（12）United States Patent
Puskarich

(10) Patent No.: US 6,458,179 B1
(45) Date of Patent: Oct. 1, 2002

(54) SOIL ACTIVATOR

(76) Inventor: Nick Puskarich, 710 5th St., Niles, OH (US) 44446

( * ) Notice: Subject to any disclaimer, the term of this patent is extended or adjusted under 35 U.S.C. 154(b) by 33 days.

(21) Appl. No.: 09/685,459

(22) Filed: Oct. 9, 2000

Related U.S. Application Data

(63) Continuation-in-part of application No. 09/414,270, filed on Oct. 7, 1999, now abandoned.

(51) Int. Cl.⁷ .......................... C05F 11/00; C05F 11/02; C05F 11/10
(52) U.S. Cl. .......................... 71/11; 47/DIG. 10; 71/13; 71/24; 71/27
(58) Field of Search .......................... 71/11, 12, 13, 71/14, 23, 24, 31, 27; 47/1.01, DIG. 10

(56) References Cited

U.S. PATENT DOCUMENTS

| | | | |
|---|---|---|---|
| 3,766,685 A * | 10/1973 | Nickerson et al. .............. | 71/27 |
| 4,006,006 A | 2/1977 | Penque ........................... | 71/14 |
| 4,067,712 A | 1/1978 | Willard, Sr. .................... | 71/24 |
| 4,067,713 A | 1/1978 | Willard, Sr. .................... | 71/24 |
| 4,067,716 A | 1/1978 | Sterrett ........................... | 71/24 |
| 4,851,027 A | 7/1989 | Murayama et al. ........ | 71/64.07 |
| 4,881,963 A | 11/1989 | Fujita et al. ................ | 71/64.07 |
| 5,014,462 A | 5/1991 | Malmgren et al. ............ | 47/1.01 |
| 5,147,442 A | 9/1992 | Kosuge et al. ............. | 71/64.07 |
| 5,409,508 A | 4/1995 | Erickson ...................... | 47/1.01 |
| 5,435,821 A | 7/1995 | Duvdevani et al. ............ | 71/28 |
| 5,443,613 A | 8/1995 | Robinson ....................... | 71/12 |
| 5,468,716 A | 11/1995 | Winston ...................... | 504/101 |
| 5,679,129 A | 10/1997 | Hon .......................... | 71/64.11 |
| 5,679,316 A | 10/1997 | Ikenaga et al. .......... | 423/449.7 |
| 5,728,648 A | 3/1998 | Delorme et al. ............. | 504/101 |
| 5,797,976 A | 8/1998 | Yamashita ..................... | 71/26 |
| 5,830,255 A | 11/1998 | Lovatt ............................ | 71/11 |
| 5,897,946 A | 4/1999 | Nachtman et al. .......... | 428/323 |

* cited by examiner

*Primary Examiner*—Wayne A. Langel
(74) *Attorney, Agent, or Firm*—Roger D. Emerson; Daniel A. Thompson; Emerson & Skeriotis

(57) ABSTRACT

A new and improved fertilizer is disclosed herein. The method for producing the fertilizer produces a substantially odor free fertilizer that produces substantially larger plants than the known fertilizers. The fertilizer includes shredded rubber, coal dust, Canadian peat, trace minerals, organic surfactant, and Nature's Blend. The invention also includes a method for producing a substantially odor free fertilizer that includes the steps of mixing rubber with an organic material, adding carbon, adding peat, adding trace minerals, and adding a surfactant.

18 Claims, No Drawings

SOIL ACTIVATOR

This application is a continuation-in-part of Ser. No. 09/414,270, SOIL ACTIVATOR, filed on Oct. 7, 1999 abandoned.

I. BACKGROUND OF THE INVENTION

A. Field of the Invention

This invention relates to the art of soil activators and methods for producing soil activators, and more particularly to a substantially odor free fertilizer and its method for production.

B. Description of the Related Art

Fertilizers are added to the soil for crops, or in some cases they can be applied directly to foliage, to supply elements needed for plant nutrition. Seventeen elements are known to be essential to the health and growth of plants. Typically, nitrogen, phosphorus, and potassium are provided in the greatest quantities. With increasing knowledge of the role of each of the nutrients essential to plants there is a better understanding of the importance of providing a given nutrient at the appropriate stage of phenology. To accomplish this, rapid changes in fertilizer formulations and methods of applications have been necessary. One factor increasing changes in fertilization formulations and methods is due to pressure from federal, state, and local regulatory agencies and citizen groups to reduce the total amount of fertilizer in general, and of specific nutrients in particular, being applied to the soil.

Established plants that are grown in soil require moisture and a number of plant nutrients, such as compounds of nitrogen, phosphorus, potassium, calcium, magnesium, iron, and other essential elements, for vigorous growth. The plant nutrients are usually water soluble and must be in a chemical form that allows them to be utilized by the plants. Thus, the mere presence of essential elemental substances in the soil does not necessarily mean that the plants are able to utilize them effectively as plant nutrients. Also, the plant nutrients should be present in the proper concentrations and ratios for the most effective utilization by the plants. As is well known, many soils are deficient in one or more plant nutrients and/or the plant nutrients that are present are not in a chemical form easily utilized by the plants.

Numerous attempts have been made to overcome the limitations and disadvantages, listed above, of natural soils. The most common approach involves analyzing the soil to determine the available plant nutrients, and then adding the deficient plant nutrients in the form of chemical fertilizers. This method is expensive, initially, and must be repeated each year to achieve the best results as all, or part of, the added plant nutrients are consumed by the growing plants. Also, the use of conventional chemical fertilizers does not aid, in any appreciable way, in the use of plant nutrients that are present in the soil in unusable form. Additionally, chemical fertilizers do not increase the resistance of the growing plants to disease or adverse environmental conditions.

One known soil preparation method is disclosed in U.S. Pat. No. 5,014,462 to Malmgren. Malmgren describes a growing medium in which soil is mixed with rubber. However, in the Malmgren patent, the particle size of the rubber is at least 5/16 of an inch and the rubber is at least 10% by volume.

Fertilizers also commonly contain secondary nutrients such as calcium, magnesium, and sulfur. Trace nutrients often found in fertilizer compositions include iron, zinc, manganese, copper, boron, and molybdenum. It is common, when insecticide or fungicidal activities are required, to add an insecticide/fungicide in a separate step. Accordingly, it would be a significant advantage to have a single formulation, which is effective as a fertilizer, an insecticide, and a fungicide.

C. Definitions

Fertilizer—One that fertilizes; any of the large number of natural and synthetic materials spread on or worked into soil to increase its fertility. The use of "fertilizer" in this application is intended to encompass the broadest possible definition of the term.

The present invention provides a new and improved fertilizer and method for making the fertilizer. This invention is simple in design, effective in use, and overcomes the foregoing difficulties and others while providing better and more advantageous overall results.

II. SUMMARY OF THE INVENTION

In accordance with the present invention, the fertilizer includes 70.57% by weight organic material, the organic material comprising 78.8% by weight Class A organic material, 0.1% by weight water soluble nitrogen, 0.9% by weight water insoluble nitrogen, 1.0% by weight phosphate ($P_2O_5$), 18.0% by weight calcium, and 1.2% by weight iron, 20.87% by weight shredded rubber, 6.96% by weight high sulfur carbon, 1.00% by weight Canadian peat, 0.50% by weight trace minerals, the trace minerals comprising calcium carbonate, dicalcium phosphate, sodium chloride, potassium sulfate, magnesium sulfate, manganous oxide, ferrous carbonate, copper sulfate, zinc oxide, ethylenediamine dihydriodide, cobalt carbonate, sodium selenite, vitamin A supplement, vitamin D supplement, vitamin E supplement, and iron oxide, and 0.10% by weight organic surfactant, the organic surfactant comprising biostimulants, B-complex vitamins, hormones, and fermentation products.

In accordance with still another aspect of the present invention, the soil activator includes an organic material, rubber, carbon, peat, and a surfactant.

In accordance with another aspect of the present invention, the rubber has a diameter of approximately 0.0625 inch or less.

In accordance with still another aspect of the present invention, the rubber is less 5% by volume, and preferably approximately between 3 and 5%.

In accordance with yet another aspect of the current invention, the activator further comprises trace minerals, the organic material is an organic fertilizer, the surfactant is an organic surfactant, the carbon is high sulfur carbon, and the peat is Canadian peat.

In accordance with another aspect of the current invention, the soil activator is approximately between 50% and 75% by weight of the organic fertilizer, approximately between 10% and 30% by weight of the rubber, approximately between 3% and 10% by weight of the high sulfur carbon, approximately between 0.1% to 5% by weight of the Canadian peat, approximately between 0.05% to 2% by weight of the trace minerals, and approximately between 0.01% to 0.5% by weight of the organic surfactant.

In accordance with still another aspect of the present invention, the soil activator is 70.57% by weight of the organic fertilizer, 20.87% by weight of the rubber, 6.96% by weight of the high sulfur carbon, 1.00% by weight of the Canadian peat, 0.50% by weight of the trace minerals, and 0.10% by weight of the organic surfactant.

In accordance with another aspect of the present invention, the soil activator is approximately 70% by weight of the organic material, approximately 21% by weight of the rubber, approximately 7% by weight of the carbon, approximately 1% by weight of the peat, and approximately 0.1% by weight of the surfactant.

In accordance with yet another aspect of the present invention, a method for producing a substantially odor-free fertilizer includes the steps of mixing rubber with an organic material, adding carbon, adding peat, adding a surfactant, and adding trace minerals.

In accordance with still another aspect of the present invention, the method includes mixing rubber with an organic fertilizer, adding high sulfur carbon, and mixing rubber with an organic fertilizer comprising pasteurized sewage sludge, nitrogen, phosphate, potassium, calcium, and iron.

In accordance with another aspect of the present invention, the method includes mixing 20.87% by weight of rubber with 70.57% by weight of an organic material, adding 6.96% by weight carbon, adding 1.00% by weight peat, and adding 0.10% by weight surfactant.

One advantage of the present invention is that the method produces a substantially odor free fertilizer.

Another advantage of the present invention is that the fertilizer produces plants that are substantially larger and healthier than those grown with known fertilizers.

Still another advantage of the present invention is that the fertilizer loosens the soil, which allows the roots to penetrate the soil more efficiently.

Yet another advantage of the present invention is that insects are kept away from the plants, and the growth of unwanted weeds is retarded, without damaging the plant.

Still yet another advantage of the present invention is that the coal dust absorbs the sun and heats up the ground.

Another advantage of the present invention is that the peat helps activate the soil, and the trace minerals help water retention in the soil.

Still another advantage of the present invention is the small diameter of the rubber blends with the soil more efficiently.

Still other benefits and advantages of the invention will become apparent to those skilled in the art upon a reading and understanding of the following detailed specification.

III. DESCRIPTION OF THE PREFERRED EMBODIMENT

The inventive soil activator is a fertilizer containing rubber, coal dust, peat, trace minerals, a surfactant, and an organic material. The inventive process begins with pasteurized sewage sludge. In the preferred embodiment, the organic starting material that is used for the inventive fertilizer is Nature's Blend, produced by the Nature's Blend Division of the City of Warren, Ohio. This organic material includes sewage sludge, nitrogen, phosphate, calcium, and iron. After the sewage sludge has been treated, and processed into Nature's Blend®, it is then a Class A organic material surpassing all of the EPA tests and regulations. The Nature's Blend® is then mixed with the above ingredients to create the inventive soil activator.

In one embodiment, the organic material, which comprises 78.8% by weight of pasteurized sewage sludge, 0.1% by weight water soluble nitrogen, 0.9% by weight water insoluble nitrogen, 1.0% by weight phosphate, 18.0% by weight calcium, and 1.2% by iron, is mixed with shredded rubber, which loosens the soil, thereby allowing the roots to more effectively and efficiently penetrate the soil. The rubber is preferably shredded into thin strips, which helps to break up the soil. The rubber is shredded into pieces that approximately have a diameter of 1/16 of inch or less. This particle size blends with the soil in order to create and maintain soil continuity and soil contact at all times. The smaller pieces aid aeration by breaking up tight soils. The rubber can be obtained from old, used tires, which to this point have been stacked in unsightly piles in large dumps. The inventive process, in using the old tires for the rubber, helps to ease the problem of storing used tires. The shredded rubber is only one embodiment of the invention, and is not intended to limit it any manner. In the preferred embodiment of this invention, after mixing with the soil, the rubber is approximately 3 to 5% by volume.

To the rubber and organic material mix is then added the high sulfur carbon, which absorbs the sunlight and heats up the ground, thereby providing needed warmth for the plants to grow. Also, the sulfur content of the carbon has the added advantage of keeping away any insects. It is to be noted, as with all of the ingredients of the inventive process and fertilizer, that the high sulfur carbon, which preferably is coal dust, is not intended to limit the invention in any manner. The high surface area of the coal dust greatly increasing the absorption and dispersion of heat into the soil. However, it is to be understood that any type of carbon can be used as long as chosen using sound engineering judgment.

To the above mixture is added the Canadian peat, which helps to activate the soil. It is unknown why, but the Canadian peat activates the soil much more efficiently than other types of peat. However, any peat can be used with this invention, as long as chosen using sound engineering judgment.

The next step is to add the trace minerals, which include calcium, phosphorus, potassium, magnesium, sodium chloride, copper, zinc, selenium, vitamin A, vitamin D, and vitamin E. The previously listed trace minerals are only a one embodiment of the invention, and are not intended to limit it in any way. Any combination of one or more of the listed trace minerals may be used, as well as any other combination or type of trace minerals, as long as chosen using sound engineering judgment. In one embodiment, the trace minerals are available from Buckeye Feed Mills, in the form of Buckeye 4% phosphorus mineral. The trace minerals aid in reducing hydration of the soil. By this is meant that the water retention for the soil is greatly increased. Also, the sodium chloride, or any other type of salt used, retards the growth of the weeds around the plants, without injuring the plants. And any weeds that do grow up are weakened, having unstable roots, and can be easily removed. It is to be understood that this invention will function without the addition of trace minerals, but will lose the advantages listed above for trace minerals.

The next step is to add an organic surfactant, which allows moisture to flow through the ground in a more efficient and easy manner. The organic surfactant also contains enzymes that aid in the activation of the soil.

In the preferred embodiment the organic surfactant that is used is # 233G Wet-Sol Gro®, produced by Schaeffer® Manufacturing Company. Wet-Sol® is a biodegradable, non-toxic, blended non-ionic, surfactant-type soil conditioner that contains bio-stimulants, B-Complex vitamins, hormones, and fermentation products. The bio-stimulants and fermentation products that are present in the Wet-Sol Gro® influence microbial and mycorrhizae populations in order to increase the availability of nutrients and moisture to the plant as it is growing. The B-complex vitamins and hormones present in the Wet-Sol Gro® not only add additional nutrients into the soil so that they are readily available to the plant as it is growing, but also act as growth regulators in order to promote root growth, better shoot growth, better germination, and greater overall plant growth. As with the previous ingredients, the use of Wet-Sol Gro® is only one embodiment of the invention, and any organic surfactant, chosen using sound engineering judgment, can be used.

The inventive soil activator, in this embodiment, is a relatively dry product that is ready to be used or placed into bags for shipping.

It is to be understood that the order in which the ingredients are added is not a art function of the invention, and is not intended to limit the invention in any manner. The ingredients can be mixed in any order, and in any manner, as long as chosen using sound engineering judgment. It is also to be understood that any organic material, as long as chosen using sound engineering judgment, can be used with this invention. The invention is not limited to the use of the Nature's Blend organic fertilizer. For example, such organic materials as compost, manure, or any type of sludge can be used as the starting material for the inventive fertilizer. Also, simply adding rubber, preferably in shredded form, to the organic material vastly increases the efficiency, and aids in plant growth.

EXAMPLE 1

The Nature's Blend, at 70.57% by weight is added to 20.87% by weight of the shredded rubber, 6.96% by weight of the high sulfur carbon, 1.00% by weight of the Canadian peat, 0.50% by weight of the trace minerals, and 0.10% by weight of the organic surfactant.

The invention has been described with reference to the preferred embodiment.

Obviously, modifications and alterations will occur to others upon a reading and understanding of the specification. It is intended by applicant to include all such modifications and alterations insofar as they come within the scope of the appended claims or the equivalents thereof.

Having thus described the invention, it is now claimed:
What is claimed is:

1. A fertilizer comprising:
   70.57% by weight organic material, the organic material comprising 78.8% by weight pasteurized sewage sludge, 0.1% by weight water soluble nitrogen, 0.9% by weight water insoluble nitrogen, 1.0% by weight phosphate ($P_2O_5$), 18.0% by weight calcium, and 1.2% by weight iron;
   20.87% by weight shredded rubber, the rubber having a particle size of 0.0625 inch or less;
   6.96% by weight high sulfur carbon;
   1.00% by weight Canadian peat;
   0.50% by weight trace minerals, the trace minerals comprising calcium carbonate, dicalcium phosphate, sodium chloride, potassium sulfate, magnesium sulfate, manganous oxide, ferrous carbonate, copper sulfate, zinc oxide, ethylenediamine dihydriodide, cobalt carbonate, sodium selenite, vitamin A supplement, vitamin D supplement, vitamin E supplement, and iron oxide; and,
   0.10% by weight organic surfactant, the organic surfactant comprising B-complex vitamins, hormones, and fermentation products.

2. A soil activator comprising:
   an organic material;
   rubber;
   high sulfur carbon;
   Canadian peat; and,
   a surfactant.

3. The soil activator of claim 2, wherein the organic material is an organic fertilizer.

4. The soil activator of claim 2, wherein the activator further comprises trace minerals.

5. The soil activator of claim 4, wherein the soil activator comprises:
   approximately between 50% and 75% by weight of the organic fertilizer;
   approximately between 10% and 30% by weight of the rubber;
   approximately between 3% and 10% by weight of the high sulfur carbon;
   approximately between 0.1% to 5% by weight of the Canadian peat;
   approximately between 0.05% to 2% by weight of the trace minerals; and,
   approximately between 0.01% to 0.5% by weight of the organic surfactant.

6. The soil activator of claim 5, wherein the soil activator comprises:
   70.57% by weight of the organic fertilizer;
   20.87% by weight of the rubber;
   6.96% by weight of the high sulfur carbon;
   1.00% by weight of the Canadian peat;
   0.50% by weight of the trace minerals; and,
   0.10% by weight of the organic surfactant.

7. The soil activator of claim 6, wherein the organic fertilizer comprises:
   pasteurized sewage sludge;
   nitrogen;
   phosphate;
   calcium; and,
   iron.

8. The soil activator of claim 7, wherein the organic surfactant comprises:
   B-complex vitamins;
   hormones; and,
   fermentation products.

9. The soil activator of claim 6, wherein the organic surfactant is a biodegradable, non-toxic, blended, non-ionic surfactant type soil conditioner.

10. The soil activator of claim 2, wherein the soil activator comprises:
    approximately 70% by weight of the organic material;
    approximately 21% by weight of the rubber;
    approximately 7% by weight of the carbon;
    approximately 1% by weight of the peat; and, approximately 0.1% by weight of the surfactant.

11. The soil activator of claim 2 wherein the rubber has a diameter of 0.0625 inch or less.

12. The soil activator of claim 2 wherein the organic material is pasteurized sewage sludge.

13. A method for producing a substantially odor-free fertilizer, the method comprising the steps of:
    mixing rubber with an organic material;

adding high sulfur carbon to the organic material;
adding Canadian peat to the organic material; and,
adding a surfactant to the organic material.

14. The method of claim 13, wherein mixing rubber with an organic material comprises the step of:

mixing rubber with an organic fertilizer, the rubber having a diameter of approximately 0.0625 inch or less.

15. The method of claim 14, wherein mixing rubber with an organic fertilizer, the rubber having a diameter of approximately 0.0625 inch or less comprises the step of:

mixing rubber, the rubber having a diameter of approximately 0.0625 inch or less, with an organic fertilizer comprising sewage sludge, nitrogen, phosphate, potassium, calcium, and iron.

16. The method of claim 13, wherein mixing rubber with an organic material, adding high sulfur carbon to the organic material, adding Canadian peat to the organic material, and adding a surfactant to the organic material comprises the steps of:

mixing 20.87% by weight of rubber with 70.57% by weight of an organic material;

adding 6.96% by weight carbon to the organic material;

adding 1.00% by weight peat to the organic material; and, adding 0.10% by weight surfactant to the organic material.

17. The method of claim 13, wherein mixing rubber with an organic material comprises the step of:

mixing rubber with pasteurized sewage sludge.

18. A method for producing an improved fertilizer, the method comprising the step of:

adding rubber to a fertilizer, the rubber having a diameter of 0.0625 inch or less.

* * * * *